(12) United States Patent
Lin (10) Patent No.: US 7,341,268 B2
(45) Date of Patent: Mar. 11, 2008

(54) FOLDABLE BICYCLE

(76) Inventor: Wang-Hsing Lin, 24, Alley 14, Lane 291, Yen Cheng Rd., Tainan (TW)

( * ) Notice: Subject to any disclaimer, the term of this patent is extended or adjusted under 35 U.S.C. 154(b) by 325 days.

(21) Appl. No.: 11/235,723

(22) Filed: Sep. 26, 2005

(65) Prior Publication Data

US 2007/0069499 A1    Mar. 29, 2007

(51) Int. Cl.
*B62K 15/00* (2006.01)
(52) U.S. Cl. ....................... 280/278; 280/287
(58) Field of Classification Search ................ 280/278, 280/287
See application file for complete search history.

(56) References Cited

U.S. PATENT DOCUMENTS

| | | | | |
|---|---|---|---|---|
| 3,887,218 A | * | 6/1975 | Di Blasi | 280/278 |
| 4,460,191 A | * | 7/1984 | Ishibashi et al. | 280/287 |
| 4,460,192 A | * | 7/1984 | Takamiya et al. | 280/287 |
| 4,824,130 A | * | 4/1989 | Chiu | 280/239 |
| 4,824,131 A | * | 4/1989 | Thay | 280/278 |
| 4,844,494 A | * | 7/1989 | Blanchard | 280/278 |
| 6,799,771 B2 | * | 10/2004 | Bigot | 280/278 |
| 6,883,817 B2 | * | 4/2005 | Chu | 280/278 |
| 7,055,842 B1 | * | 6/2006 | Lin | 280/278 |
| 2004/0061304 A1 | * | 4/2004 | Lim | 280/278 |
| 2005/0017479 A1 | * | 1/2005 | Liu | 280/287 |
| 2005/0035570 A1 | * | 2/2005 | Chu | 280/278 |

FOREIGN PATENT DOCUMENTS

EP        388540 A1 *  9/1990

* cited by examiner

*Primary Examiner*—Kevin Hurley
(74) *Attorney, Agent, or Firm*—Alan Kamrath; Kamrath & Associates PA (57) ABSTRACT

A foldable bicycle includes a front frame, a rear frame, two seat plates, a middle frame, a seat post, and a handlebar unit. Thus, when the bicycle is folded, the front frame, the middle frame and the rear frame are parallel with other, and the handlebar unit is folded, so that the parts of the bicycle are fully folded to reduce the volume largely, thereby greatly saving the space of storage and transportation, and thereby facilitating a user carrying the bicycle.

20 Claims, 10 Drawing Sheets

FOLDABLE BICYCLE

BACKGROUND OF THE INVENTION

1. Field of the Invention

The present invention relates to a foldable bicycle, and more particularly to a skeleton or frame for a foldable bicycle.

2. Description of the Related Art

A conventional foldable bicycle comprises a frame or skeleton that can be partially folded when not in use so as to reduce the volume of the bicycle, thereby saving the space of storage and transportation, and thereby facilitating a user carrying the bicycle. However, the conventional foldable bicycle cannot be folded easily and rapidly, thereby causing inconvenience to the user when folding the bicycle. In addition, the frame of the bicycle cannot be folded completely, so that the bicycle still occupies a larger space of storage when not in use.

SUMMARY OF THE INVENTION

In accordance with the present invention, there is provided a foldable bicycle, comprising a front frame, a rear frame, two seat plates, and a middle frame. The front frame includes a head tube, a front wheel bracket mounted on a lower end of the head tube, a lower mounting seat pivotally mounted on the lower end of the head tube, an upper mounting seat mounted on an upper end of the head tube, and a link having a first end pivotally mounted on the upper mounting seat. The rear frame includes two chain stays parallel with each other, a linkage pivotally mounted between the two chain stays, a pivot plate mounted between the two chain stays, a shock-absorbing member having a first end pivotally mounted on a first end of the linkage and a second end pivotally mounted on the pivot plate, and an upward extended curved section mounted between front ends of the two chain stays. The two seat plates are mounted between the front frame and the rear frame and parallel with each other, and a straddle portion is mounted between the two seat plates. Each of the two seat plates has a mediate portion formed with an arc-shaped slot, and a quick release clamp is mounted between the arc-shaped slots of the two seat plates. The link of the front frame has a second end pivotally mounted between front ends of the two seat plates, and the curved section of the rear frame is pivotally mounted between rear ends of the two seat plates. The middle frame includes an oblique seat tube extended through the straddle portion between the two seat plates and having a lower end mounted on the lower mounting seat of the front frame, a pivot seat mounted on an upper end of the seat tube, and a support member having a first end pivotally mounted on the pivot seat and a second end pivotally mounted on a second end of the linkage.

The primary objective of the present invention is to provide a foldable bicycle that can be folded completely.

Another objective of the present invention is to provide a foldable bicycle, wherein when the bicycle is folded, the front frame, the middle frame and the rear frame are parallel with other, and the handlebar unit is folded, so that the parts of the bicycle are fully folded to reduce the volume largely, thereby greatly saving the space of storage and transportation, and thereby facilitating a user carrying the bicycle.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-4, a foldable bicycle in accordance with the preferred embodiment of the present invention comprises a front frame 1, a rear frame 2, two seat plates 3, a middle frame 4, a seat post 5, and a handlebar unit 6.

The front frame 1 includes a head tube 10, a substantially inverted U-shaped front wheel bracket 11 mounted on a lower end of the head tube 10, a front wheel 111 rotatably mounted on the front wheel bracket 11, a substantially U-shaped lower mounting seat 121 pivotally mounted on the lower end of the head tube 10 by a substantially U-shaped connector 12 located above the front wheel bracket 11, a storage box 13 mounted on a mediate portion of the head tube 10, an upper mounting seat 14 mounted on an upper end of the head tube 10, a link 141 having a first end pivotally mounted on the upper mounting seat 14, a steering tube 16 retractably mounted on the upper end of the head tube 10, and a quick release clamp 15 mounted between the steering tube 16 and the head tube 10 and located above the upper mounting seat 14 to position the steering tube 16 on the head tube 10.

The rear frame 2 includes two substantially L-shaped chain stays 20 parallel with each other, a substantially V-shaped linkage 22 pivotally mounted between the two chain stays 20, a pivot plate 24 mounted between the two chain stays 20, a shock-absorbing member 23 having a first end pivotally mounted on a first end of the linkage 22 and a second end pivotally mounted on the pivot plate 24, a rear wheel 21 rotatably mounted between rear ends of the two chain stays 20, an upward extended curved section 25 mounted between front ends of the two chain stays 20, and two pedals 26 mounted on the front ends of the two chain stays 20.

The two seat plates 3 are mounted between the front frame 1 and the rear frame 2 and parallel with each other. Each of the two seat plates 3 is a substantially arc-shaped plate having a wider front portion and a narrower rear portion. The link 141 of the front frame 1 has a second end pivotally mounted between front ends of the two seat plates 3, and the curved section 25 of the rear frame 2 is pivotally mounted between rear ends of the two seat plates 3. Each of the two seat plates 3 has a mediate portion formed with an arc-shaped slot 32. A quick release clamp 33 is mounted between the arc-shaped slots 32 of the two seat plates 3. A substantially inverted U-shaped straddle portion 31 is mounted between the front ends of the two seat plates 3.

The middle frame 4 includes an oblique seat tube 40 extended through the straddle portion 31 between the two seat plates 3 and having a lower end mounted on the lower mounting seat 121 of the front frame 1, a pivot seat 41 mounted on an upper end of the seat tube 40, and a substantially arc-shaped support member 411 having a first end pivotally mounted on the pivot seat 41 and a second end pivotally mounted on a second end of the linkage 22. The seat tube 40 is positioned between the two seat plates 3 by the quick release clamp 33 mounted between the arc-shaped slots 32 of the two seat plates 3.

The seat post 5 has a lower end retractably mounted on the upper end of the seat tube 40 by a quick release clamp 412 and an upper end provided with a saddle 51. The saddle 51 is mounted on the seat post 5 by a quick release clamp 52.

Referring to FIGS. 1-10, the handlebar unit 6 is foldably mounted on an upper end of the steering tube 16 of the front frame 1 and includes a stem 61 having a first end formed with a sleeve 611 mounted on the upper end of the steering tube 16 of the front frame 1 and a second end formed with a platform 612 having a bottom formed with two parallel upright support plates 613, two handlebars 64 each having a substantially cylindrical end portion 641 pivotally mounted on the stem 61 between the two support plates 613 and having a side formed with two locking blocks 6412 and two receiving recesses 6414 located beside the two locking blocks 6412, a pivot assembly 65 extended through the stem 61 and the two handlebars 64 so that the two handlebars 64 are pivotally mounted on the stem 61, a stop member 63 movably mounted on the bottom of the platform 612 between the two support plates 613 and having two protruding stop portions 633 that are movable between a first position where the two stop portions 633 of the stop member 63 are rested on the two locking blocks 6412 of each of the two handlebars 64 so that each of the two handlebars 64 are locked on the stem 61 and a second position where the two stop portions 633 of the stop member 63 are detached from the two locking blocks 6412 and received in the two receiving recesses 6414 of each of the two handlebars 64 so that each of the two handlebars 64 are unlocked from and pivoted relative to the stem 61, a plurality of elastic members 635 biased between the stop member 63 and one of the two support plates 613 so that the two stop portions 633 of the stop member 63 are rested on the two locking blocks 6412 of each of the two handlebars 64 normally, and an operation knob 62 movably mounted on a top of the platform 612 and connected to the stop member 63 to move the stop member 63.

Figure 1:
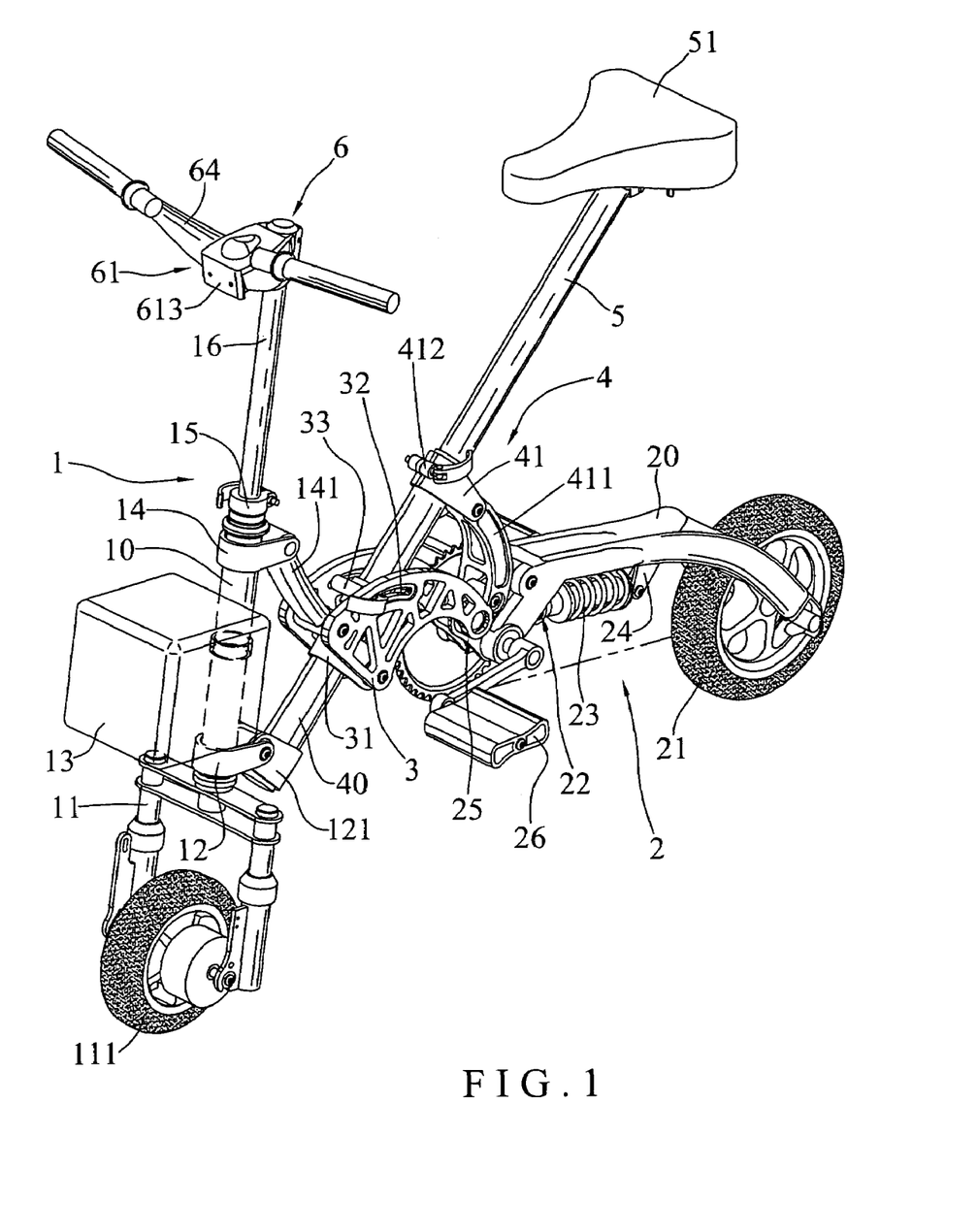
FIG. 1 is a perspective view of a foldable bicycle in accordance with the preferred embodiment of the present invention.
Figures 2, 3:
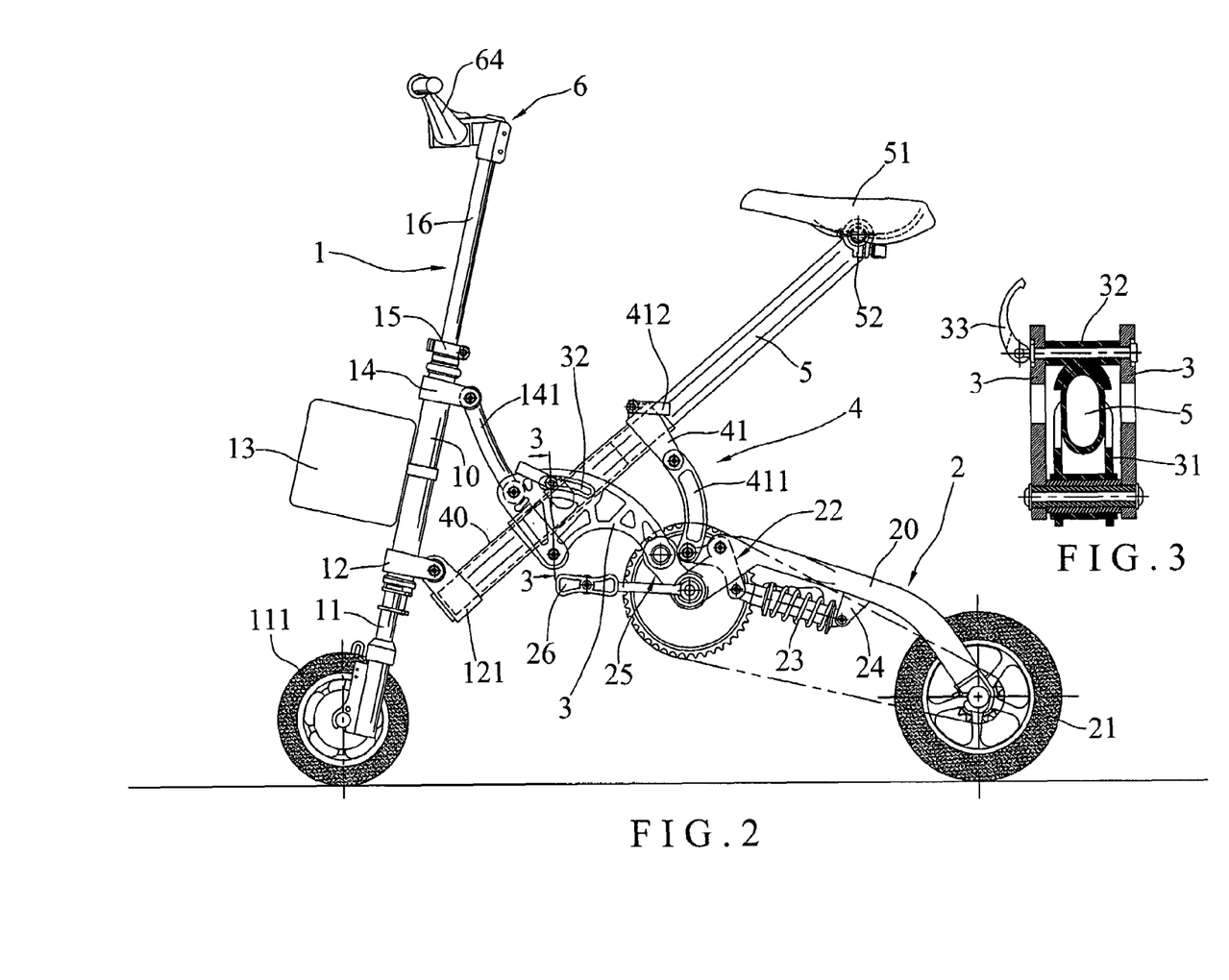
FIG. 2 is a side plan view of the foldable bicycle as shown in FIG. 1.
FIG. 3 is a plan cross-sectional view of the foldable bicycle taken along line 3-3 as shown in FIG. 2.
Figure 4:
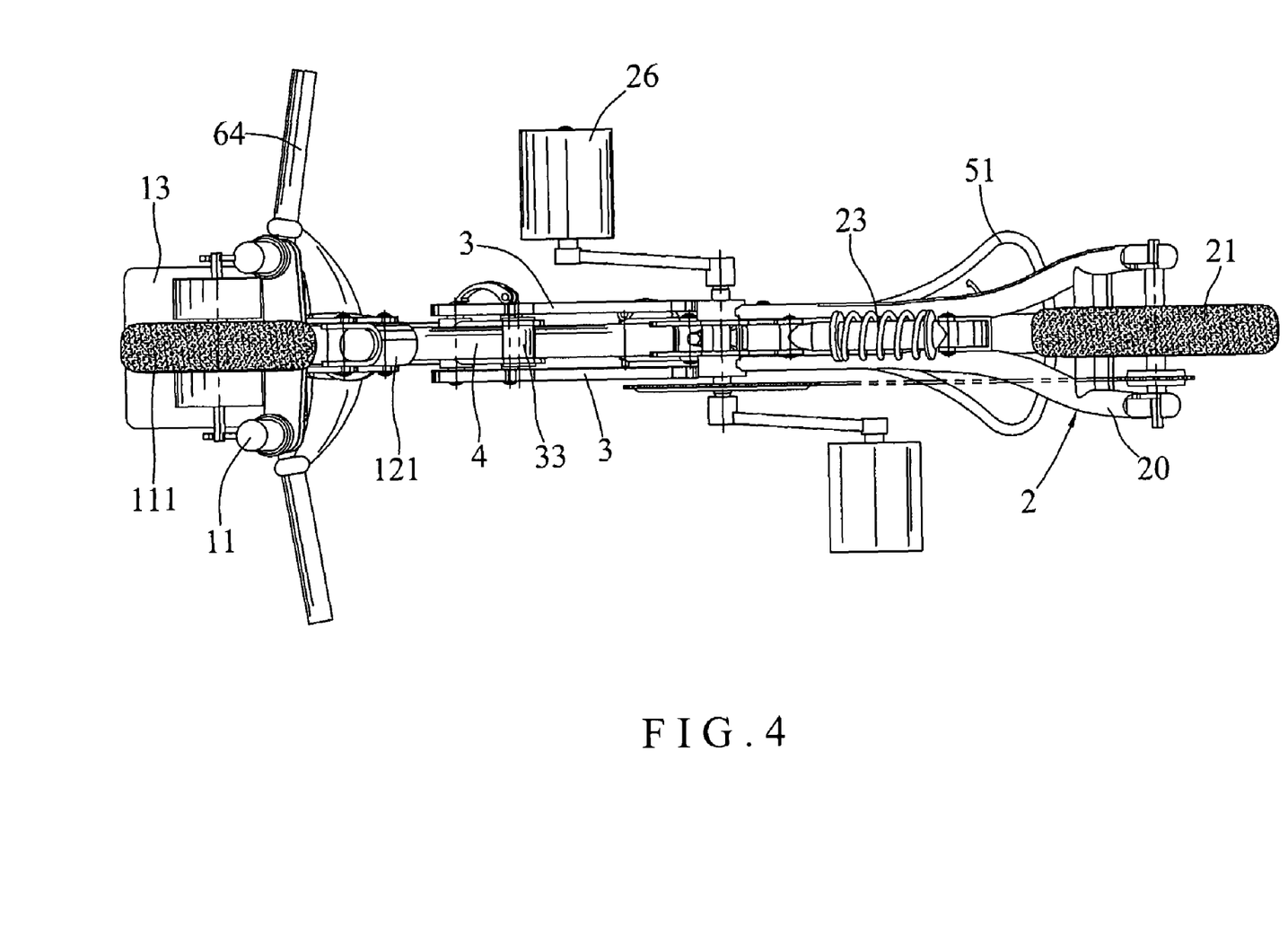
FIG. 4 is a top plan view of the foldable bicycle as shown in FIG. 1.
Figure 5:
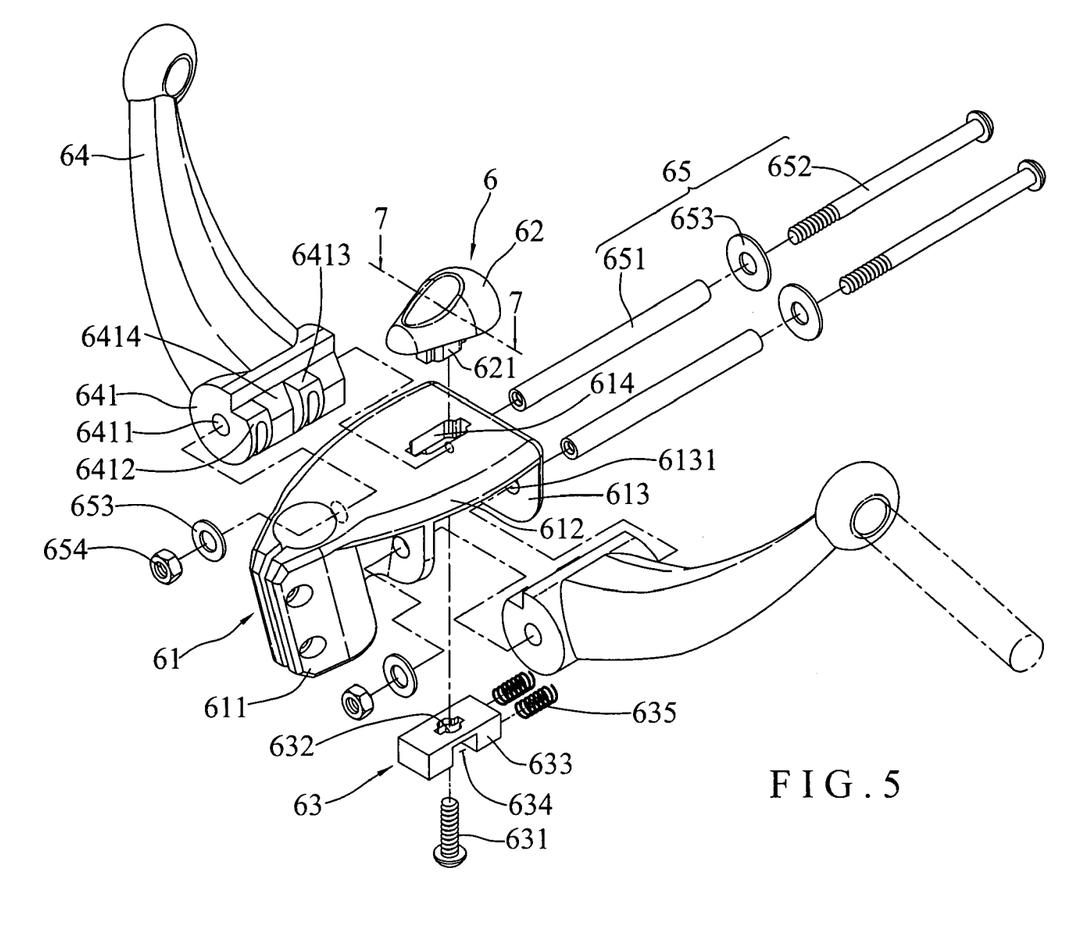
FIG. 5 is an exploded perspective view of a handlebar unit of the foldable bicycle as shown in FIG. 1.

The platform 612 of the stem 61 has a surface formed with a slideway 614. Each of the two support plates 613 of the stem 61 has two through holes 6131.

The operation knob 62 has a bottom formed with a slide 621 slidably mounted in the slideway 614 of the platform 612.

The stop member 63 is substantially inverted U-shaped and has an opening 634 defined between the two stop portions 633 to receive one of the two locking blocks 6412 of each of the two handlebars 64 when the two stop portions 633 of the stop member 63 are disposed at the second position. The stop member 63 has a surface formed with a through hole 632, and a screw member 631 is extended through the through hole 632 of the stop member 63 and screwed into the slide 621 of the operation knob 62 to secure the stop member 63 to the operation knob 62.

The end portion 641 of each of the two handlebars 64 has a shaft hole 6411. Each of the two locking blocks 6412 of each of the two handlebars 64 has a side formed with a resting face 6413 rested on the respective stop portion 633 of the stop member 63 when the two stop portions 633 of the stop member 63 are disposed at the first position.

The pivot assembly 65 includes two mounting tubes 651 located between the two support plates 613 of the stem 61 and extended through the through holes 6131 of each of the two support plates 613 and the shaft hole 6411 of each of the two handlebars 64, two threaded rods 652 extended through washers 653 and the two mounting tubes 651, and two locking nuts 654 screwed onto the two threaded rods 652, so that the two handlebars 64 are pivotally mounted on the stem 61.

Figure 6:
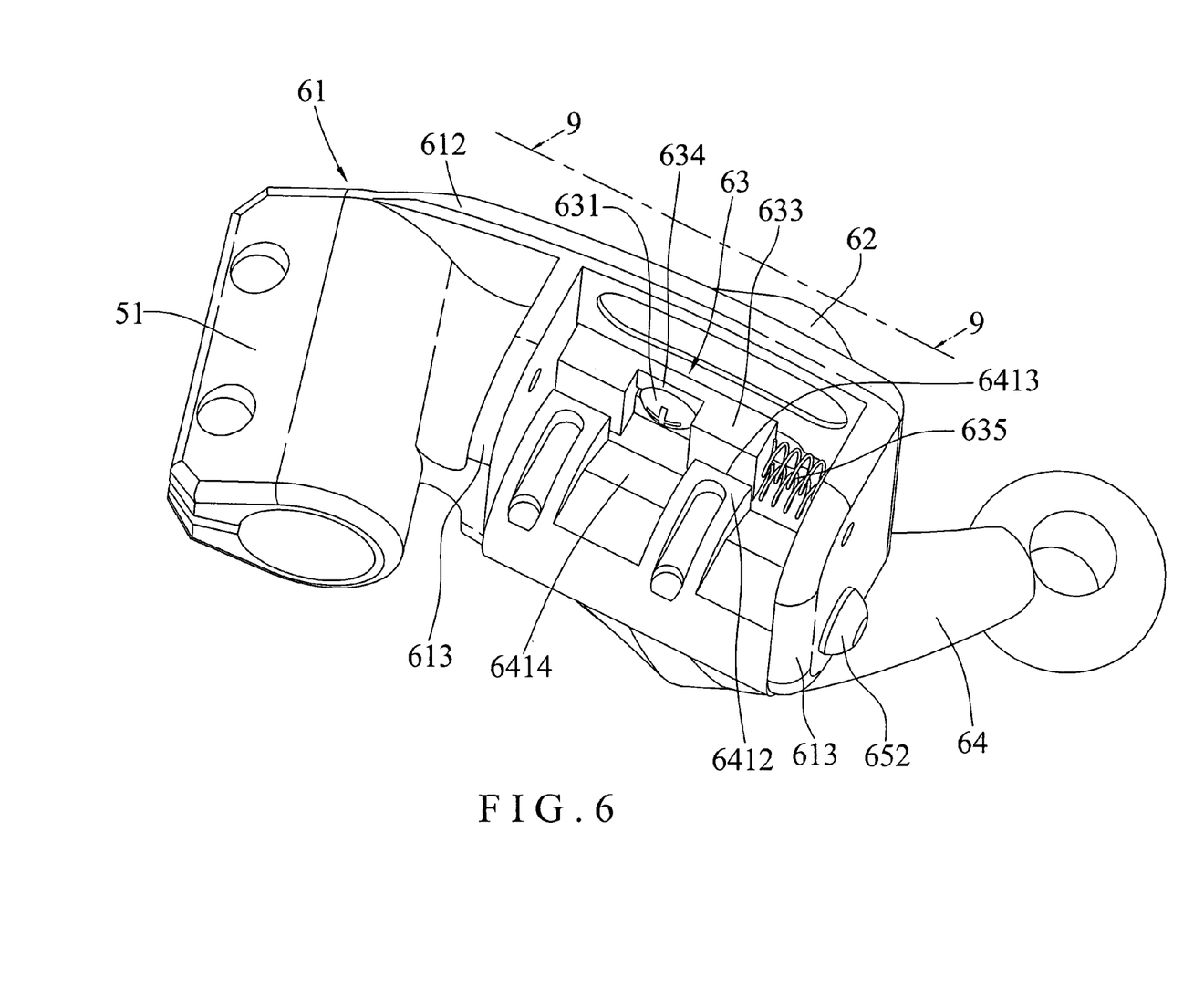
FIG. 6 is a partially perspective assembly view of the handlebar unit of the foldable bicycle as shown in FIG. 5.
Figure 7:
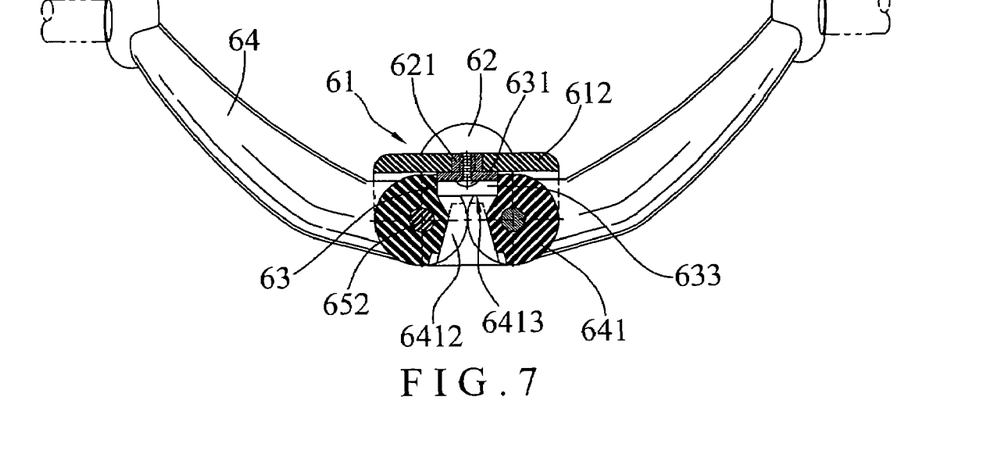
FIG. 7 is a plan cross-sectional view of the handlebar unit of the foldable bicycle taken along line 7-7 as shown in FIG. 5.
Figure 9:
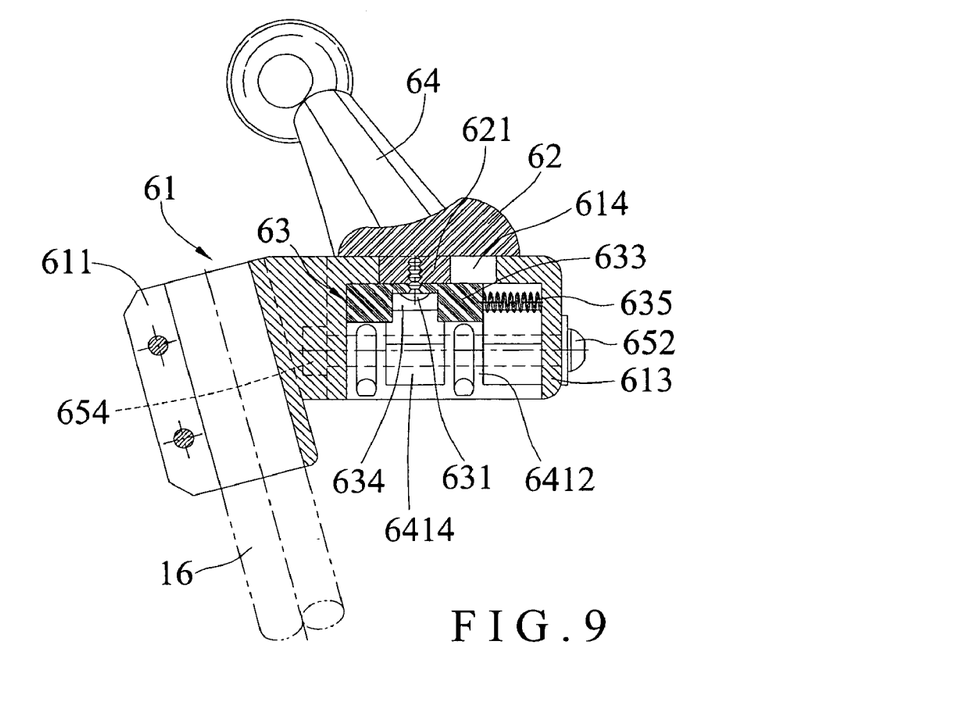
FIG. 9 is a plan cross-sectional view of the handlebar unit of the foldable bicycle taken along line 9-9 as shown in FIG. 6.

As shown in FIGS. 6 and 9, the two stop portions 633 of the stop member 63 are rested on the two locking blocks 6412 of each of the two handlebars 64 normally by the restoring force of the elastic members 635 so that each of the two handlebars 64 are locked on the stem 61 as shown in FIG. 7.

Figure 8:
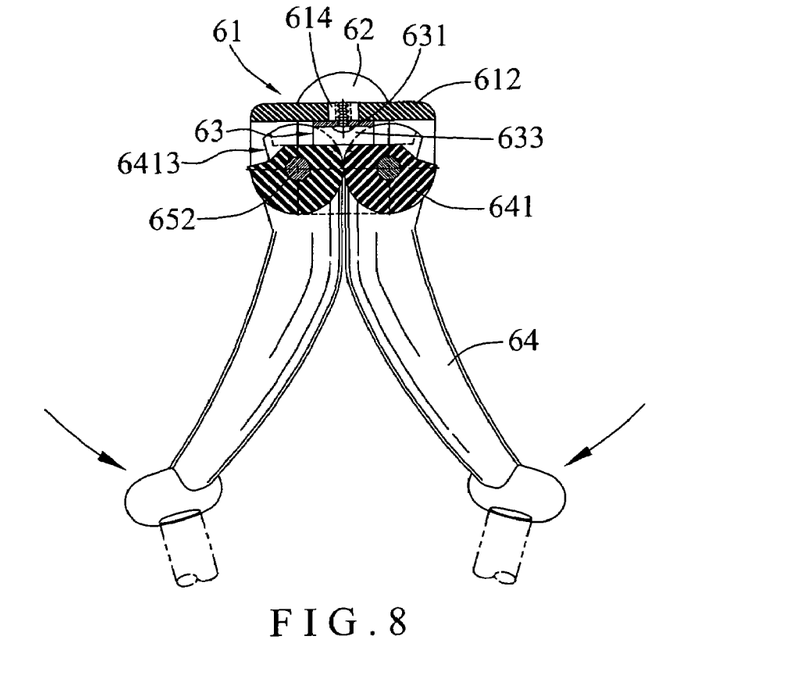
FIG. 8 is a schematic operational view of the handlebar unit of the foldable bicycle as shown in FIG. 7.
Figure 10:
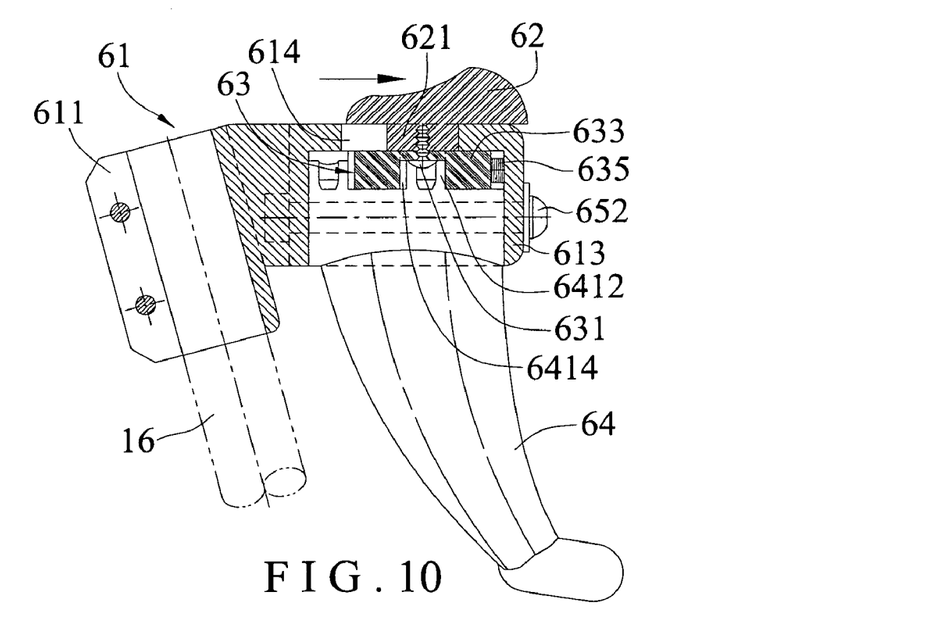
FIG. 10 is a schematic operational view of the handlebar unit of the foldable bicycle as shown in FIG. 9.

As shown in FIG. 10, the stop member 63 is moved by the operation knob 62 to overcome the restoring force of the elastic members 635 so that the two stop portions 633 of the stop member 63 are detached from the two locking blocks 6412 and received in the two receiving recesses 6414 of each of the two handlebars 64. Thus, each of the two handlebars 64 are unlocked from the stem 61 and can be pivoted downward relative to the stem 61 as shown in FIG. 8, thereby folding the two handlebars 64 of the handlebar unit 6.

Figure 11:
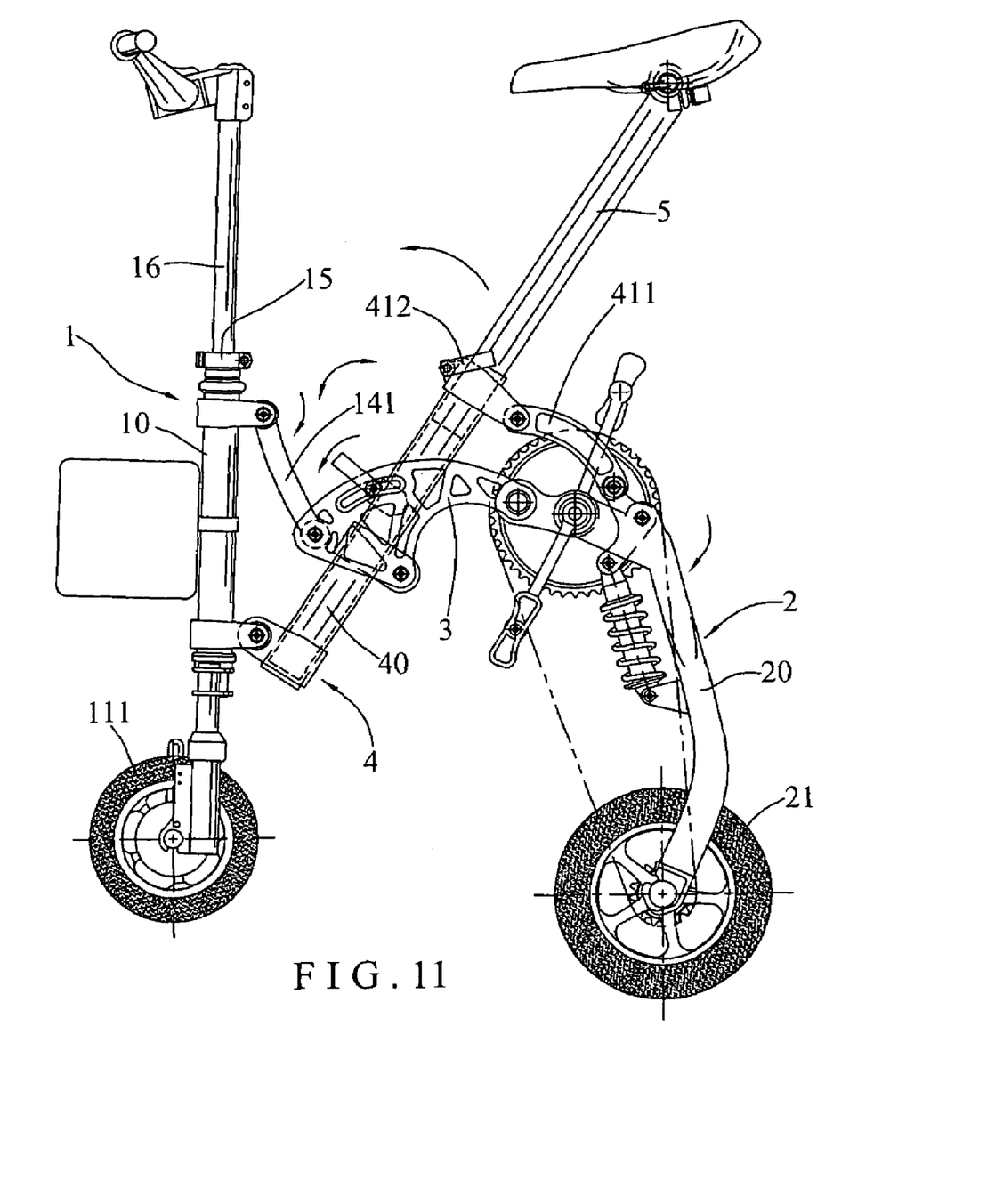
FIG. 11 is a schematic operational view of the foldable bicycle as shown in FIG. 2.

As shown in FIG. 11, the quick release clamp 33 mounted between the arc-shaped slots 32 of the two seat plates 3 is loosened to release the seat tube 40 from the two seat plates 3. Thus, the front frame 1 and the rear frame 2 are moved toward each other in a parallel manner. At this time, the link 141, the two seat plates 3 and the support member 411 are driven by the front frame 1 and the rear frame 2 to retract inward until the front frame 1, the middle frame 4 and the rear frame 2 are parallel with other.

Figure 12:
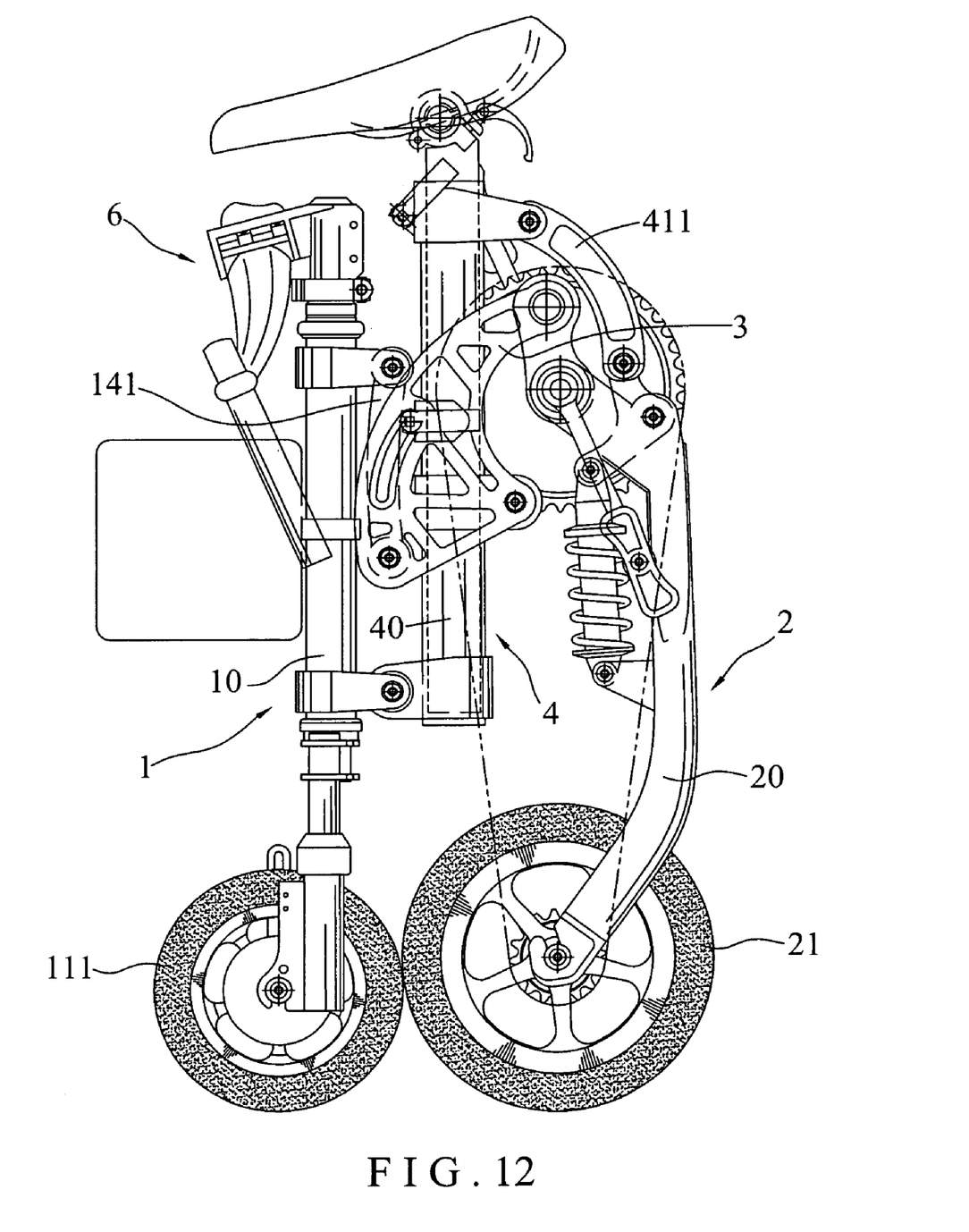
FIG. 12 is a schematic operational view of the foldable bicycle as shown in FIG. 11.

As shown in FIG. 12, the front frame 1, the middle frame 4 and the rear frame 2 are parallel with other, and the handlebar unit 6 is folded. At this time, the quick release clamp 15 is loosened to release the steering tube 16 so that the steering tube 16 can be retracted into the head tube 10, and the quick release clamp 412 is loosened to release the seat post 5 so that the seat post 5 can be retracted into the seat tube 40.

Figure 13:
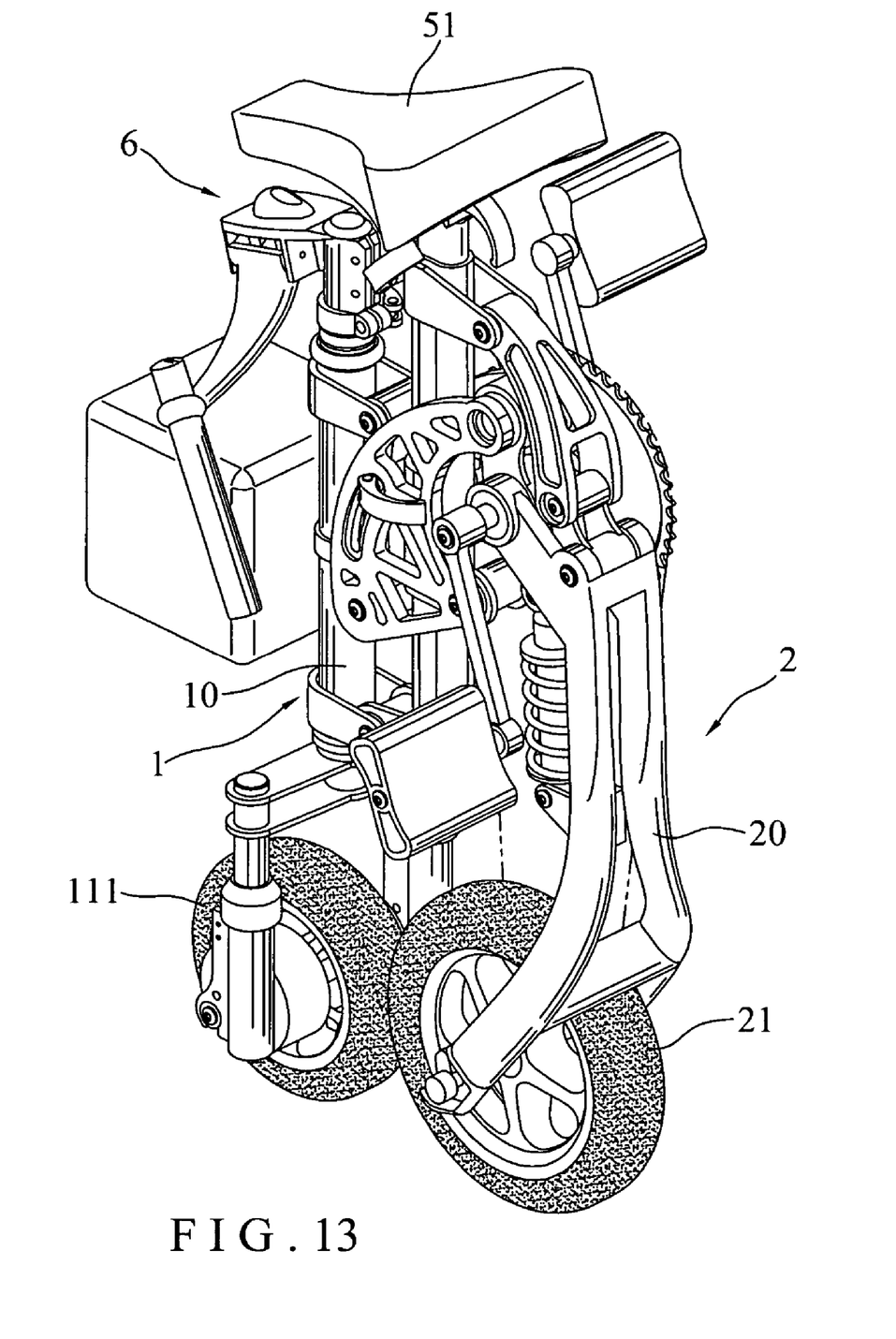
FIG. 13 is a schematic operational view of the foldable bicycle as shown in FIG. 1.

As shown in FIG. 13, the front frame 1, the middle frame 4 and the rear frame 2 are parallel with other, and the handlebar unit 6 is folded, thereby folding the bicycle.

Accordingly, when the bicycle is folded, the front frame 1, the middle frame 4 and the rear frame 2 are parallel with other, and the handlebar unit 6 is folded, so that the parts of the bicycle are fully folded to reduce the volume largely, thereby greatly saving the space of storage and transportation, and thereby facilitating a user carrying the bicycle. In addition, the bicycle is folded and unfolded easily and rapidly, thereby facilitating a user folding and expanding the bicycle.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A foldable bicycle, comprising a front frame, a rear frame, two seat plates, a middle frame, wherein:
    the front frame includes a head tube, a front wheel bracket mounted on a lower end of the head tube, a lower mounting seat pivotally mounted on the lower end of the head tube, an upper mounting seat mounted on an upper end of the head tube, and a link having a first end pivotally mounted on the upper mounting seat;
    the rear frame includes two chain stays parallel with each other, a linkage pivotally mounted between the two chain stays, a pivot plate mounted between the two chain stays, a shock-absorbing member having a first end pivotally mounted on a first end of the linkage and a second end pivotally mounted on the pivot plate, and an upward extended curved section mounted between front ends of the two chain stays;
    the two seat plates are mounted between the front frame and the rear frame and parallel with each other, and a straddle portion is mounted between the two seat plates;
    each of the two seat plates has a mediate portion formed with an arc-shaped slot, and a quick release clamp is mounted between the arc-shaped slots of the two seat plates;
    the link of the front frame has a second end pivotally mounted between front ends of the two seat plates, and the curved section of the rear frame is pivotally mounted between rear ends of the two seat plates;
    the middle frame includes an oblique seat tube extended through the straddle portion between the two seat plates and having a lower end mounted on the lower mounting seat of the front frame, a pivot seat mounted on an upper end of the seat tube, and a support member having a first end pivotally mounted on the pivot seat and a second end pivotally mounted on a second end of the linkage.

2. The foldable bicycle in accordance with claim 1, wherein the seat tube is positioned between the two seat plates by the quick release clamp mounted between the arc-shaped slots of the two seat plates.

3. The foldable bicycle in accordance with claim 1, wherein the front frame further includes a steering tube retractably mounted on the upper end of the head tube, and the foldable bicycle further comprises a handlebar unit foldably mounted on an upper end of the steering tube of the front frame.

4. The foldable bicycle in accordance with claim 3, wherein the handlebar unit includes a stem having a first end formed with a sleeve mounted on the upper end of the steering tube of the front frame and a second end formed with a platform having a bottom formed with two parallel upright support plates, two handlebars each having a substantially cylindrical end portion pivotally mounted on the stem between the two support plates and having a side formed with two locking blocks and two receiving recesses located beside the two locking blocks, a pivot assembly extended through the stem and the two handlebars so that the two handlebars are pivotally mounted on the stem, a stop member movably mounted on the bottom of the platform between the two support plates and having two protruding stop portions that are movable between a first position where the two stop portions of the stop member are rested on the two locking blocks of each of the two handlebars so that each of the two handlebars are locked on the stem and a second position where the two stop portions of the stop member are detached from the two locking blocks and received in the two receiving recesses of each of the two handlebars so that each of the two handlebars are unlocked from and pivoted relative to the stem, a plurality of elastic members biased between the stop member and one of the two support plates so that the two stop portions of the stop member are rested on the two locking blocks of each of the two handlebars normally, and an operation knob movably mounted on a top of the platform and connected to the stop member to move the stop member.

5. The foldable bicycle in accordance with claim 4, wherein the stop member is substantially inverted U-shaped and has an opening defined between the two stop portions to receive one of the two locking blocks of each of the two handlebars when the two stop portions of the stop member are disposed at the second position.

6. The foldable bicycle in accordance with claim 4, wherein the platform of the stem has a surface formed with a slideway, and the operation knob has a bottom formed with a slide slidably mounted in the slideway of the platform.

7. The foldable bicycle in accordance with claim 6, wherein the stop member has a surface formed with a through hole, and a screw member is extended through the through hole of the stop member and screwed into the slide of the operation knob to secure the stop member to the operation knob.

8. The foldable bicycle in accordance with claim 4, wherein each of the two locking blocks of each of the two handlebars has a side formed with a resting face rested on the respective stop portion of the stop member when the two stop portions of the stop member are disposed at the first position.

9. The foldable bicycle in accordance with claim 4, wherein each of the two support plates of the stem has two through holes, the end portion of each of the two handlebars has a shaft hole, and the pivot assembly includes two mounting tubes located between the two support plates of the stem and extended through the through holes of each of the two support plates and the shaft hole of each of the two handlebars, two threaded rods extended through washers and the two mounting tubes, and two locking nuts screwed onto the two threaded rods, so that the two handlebars are pivotally mounted on the stem.

10. The foldable bicycle in accordance with claim 1, further comprising a seat post having a lower end retractably mounted on the upper end of the seat tube by a quick release clamp and an upper end provided with a saddle which is mounted on the seat post by a quick release clamp.

11. The foldable bicycle in accordance with claim 1, wherein the front wheel bracket is substantially inverted U-shaped.

12. The foldable bicycle in accordance with claim 1, wherein the lower mounting seat is substantially U-shaped.

13. The foldable bicycle in accordance with claim 1, wherein the lower mounting seat is pivotally mounted on the lower end of the head tube by a substantially U-shaped connector located above the front wheel bracket.

14. The foldable bicycle in accordance with claim 1, wherein the front frame further includes a quick release clamp mounted between the steering tube and the head tube and located above the upper mounting seat to position the steering tube on the head tube.

15. The foldable bicycle in accordance with claim 1, wherein each of the two chain stays is substantially L-shaped.

16. The foldable bicycle in accordance with claim 1, wherein the linkage is substantially V-shaped.

17. The foldable bicycle in accordance with claim 1, wherein each of the two seat plates is a substantially arc-shaped plate having a wider front portion and a narrower rear portion.

18. The foldable bicycle in accordance with claim 1, wherein the straddle portion is substantially inverted U-shaped.

19. The foldable bicycle in accordance with claim 1, wherein the support member is substantially arc-shaped.

20. The foldable bicycle in accordance with claim 1, wherein the rear frame further includes two pedals mounted on the front ends of the two chain stays.

* * * * *